Oct. 19, 1965    F. W. WINK    3,212,589
PORTABLE ROCK DRILL
Filed Nov. 28, 1962    4 Sheets-Sheet 1
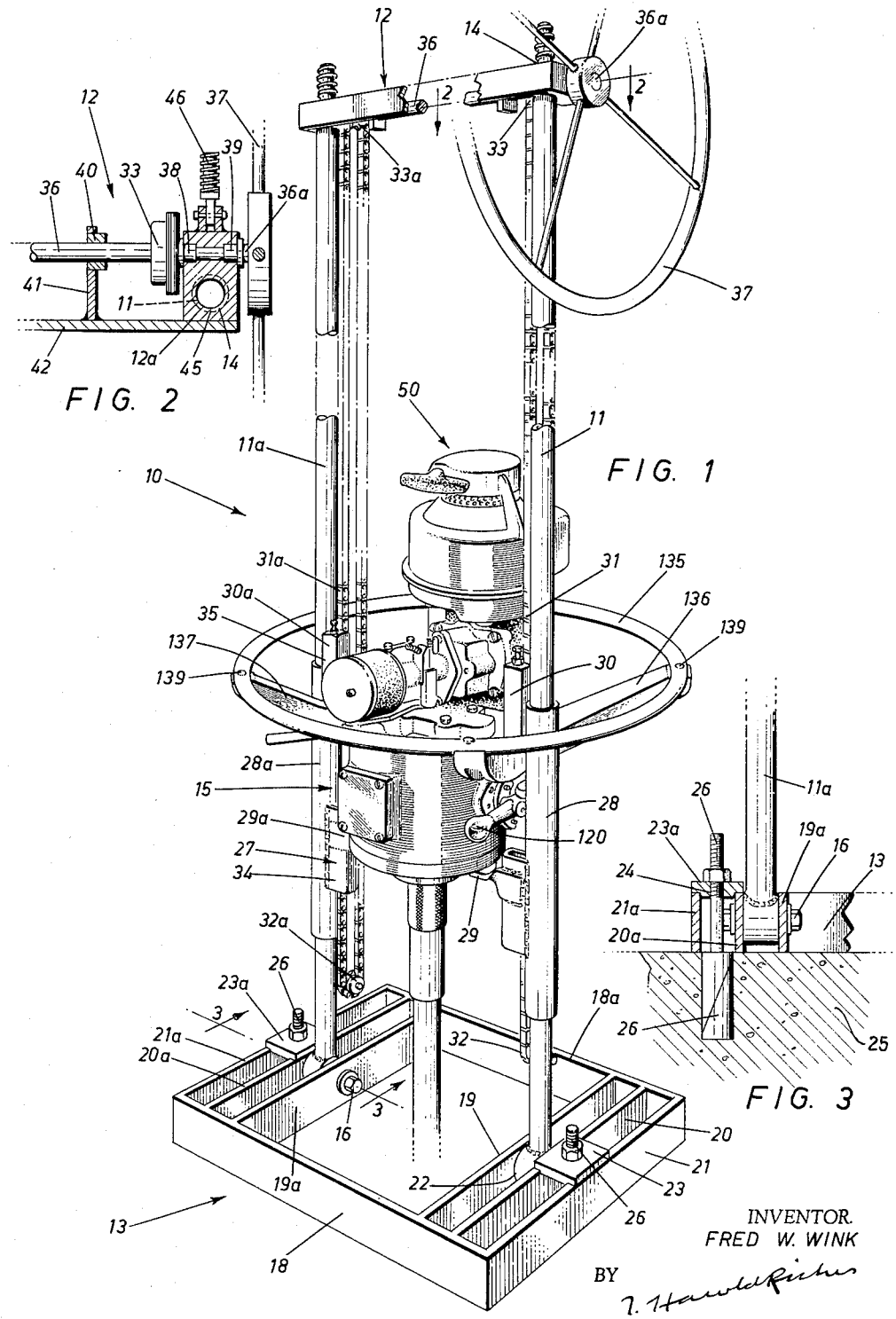
INVENTOR.
FRED W. WINK
BY
Attorney

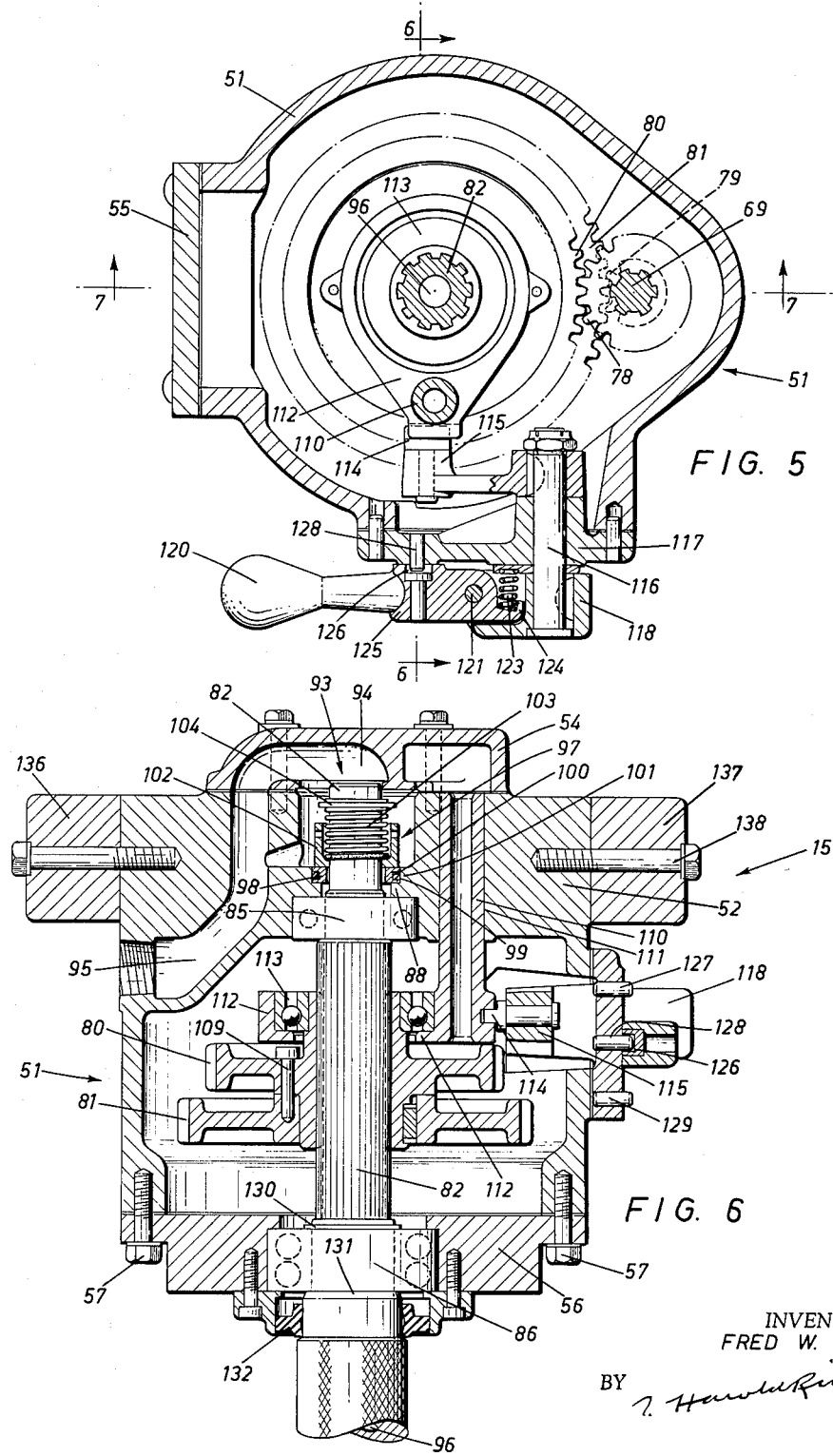

INVENTOR.
FRED W. WINK

United States Patent Office 3,212,589
Patented Oct. 19, 1965

1

3,212,589
PORTABLE ROCK DRILL
Fred W. Wink, Willowdale, Ontario, Canada, assignor to J. K. Smit & Sons International Limited, Toronto, Ontario, Canada
Filed Nov. 28, 1962, Ser. No. 240,595
7 Claims. (Cl. 173—57)

This invention relates to improvements in rock drills. It is more particularly directed to a portable, high speed drill and support mechanism for drilling holes in consolidated and unconsolidated materials and for coring holes in consolidated rock.

Heretofore, drills of the type utilized for the drilling and coring of exploration holes have of necessity been either heavy, cumbersome and difficult to transport, or light, fragile and unreliable in operation. In areas of rough and difficult terrain, for example, where the need for drilling necessitates the transportation of drills, it has been found necessary to pack the heavy drills now on the market in separate pieces, usually employing the services of four or five men, merely to carry the drill to its destination. Then, of course, the drill must be reassembled before it can be used.

While some attempts have been made to utilize drills of a light weight, portable nature for obtaining core samples, most known devices are capable of drilling only to a shallow depth and are, in themselves, not only as complicated and costly as the heavier drills now in use, but also unreliable and unpredictable in operation. In contrast, the drilling assembly of the present invention, while readily portable, has been employed successfully in drilling and recovering cores two inches in diameter to depths of 450 feet.

It is, therefore, a principal object of the present invention to provide a portable, lightweight drill of the type driven either by an internal combustion engine or an electric, pneumatic or hydraulic motor which is reliable in operation and which will drill in any dip position.

Another important object of my present invention is the provision of a lightweight, portable drill having all the advantages of the larger drills now on the market in drilling to considerable depths and of taking large core samples while providing the added advantage of lightweight portability.

While the present invention provides a portable drill which can be readily supported, carried manually, and manipulated in the drilling of shallow holes, it has been found to be impractical to manually support the drill while in the process of drilling relatively deep holes. As the drilling rate of rotary or percussion drills is usually relatively slow, about 40 feet per 8 hour shift in hard, consolidated rock, it is impractical for a workman to support the weight of a machine continuously, thus necessitating frequent shut-downs. This results in lost time which adds appreciably to the cost of drilling. In addition, in order to achieve optimum drilling rates and core recoveries, it is usually necessary not only to rigidly preserve the direction in which the drill is boring, that is, to maintain the dip and strike of the hole but also to maintain a uniform pressure on the cutting face of the drill bit or to simultaneously vary bit pressure and the rotational speed of the bit to compensate for variations in the characteristics of the rock formation. It has been found to be extremely difficult, if not impossible, under conditions of manual control alone to achieve these requirements and log continuous drilling hours, and thus there is a need for a lightweight, readily portable drill carriage or support and control apparatus which can be adjusted to and locked at any desired dip and strike angle. Also, it has heretofore been an inherent disadvantage of preexisting portable drilling devices to require two men

2 for the operation of the drill unit. I have found that by the use of the carriage assembly described in detail hereinafter, in combination with the present drill, that not only can the drill be readily operated by one man but also the above-mentioned disadvantages are substantially obviated.

It is, therefore, an additional important object of the present invention to provide a carriage assembly in combination with my drill which is relatively light in weight and is readily transportable and which can be used to support and control the operation of a drill in rock drilling and earth boring operations at any dip angle between the horizontal and vertical planes.

Another important object of the present invention is the provision of a carriage assembly employed in combination with the drill which will maintain the drill in axial alignment with the centerline of the hole regardless of the pressure applied to the drill bit or coring tool.

In order to drill satisfactorily with rock drills, especially with diamond drills, it is necessary to provide a continuous stream of water to the drilling bit. To this end it has been customary to use a hollow drill rod and drill spindle through which water is forced to the bit while it is being rotated. The water supply to the hollow drill spindle normally is made through a rotatable connection which is attached to the upper end of the drill rod, core barrel, or adaptor as the case may be. In drilling deep holes, particularly in confined spaces, it is necessary to use a drill rod or core barrel composed of many sections, each of the sections being from 20 to 60 inches long, depending upon the work space available. It has been customary to use a hollow spindle connected to the drilling section, each new section being added to the preceding section as the drilling advances until finally the desired hole depth is obtained. As explained above, the water connection, is at the upper end of the drill rod or the like and hence, in order to add each new section to the drill rod, it has been necessary to disconnect the water swivel, add the additional section and finally again reconnect the water swivel for further drilling operation. Obviously, much non-productive time and labour is consumed in this operation.

It is, therefore, an important feature of the present invention to provide a water inlet in the casing leading directly to the top of the output shaft coupled to the drill rods while sealing the same completely from the gears and other working parts of the drill.

A still further object is the provision of a sealed leakage outlet for draining any water which by-passes the water seal, the leakage of water being useful to indicate a faulty seal.

Another disadvantage inherent in portable drills is the transmittal of the torque load from a long string of drill rods and coring, cutting, reaming or the like tools to the drive motor when drilling is commenced. This problem is especially augmented when the bit or drill rods are tightly lodged in the drill hole. This sudden loading of the drive motor normally results in the stalling of portable drill motors in that the drive motor is undersized to provide for portability and cannot meet the sudden load placed on it.

It is, therefore, an important object of the present invention to obviate stalling of the motor by the provision of a clutch and gear shift between the drive motor and output spindle such that the motor can be accelerated while disengaged from the output spindle to bring the motor up to its normal drilling speed and then put into gear at low or high speeds for gradual loading of the drive motor.

Another object resides in the novel circular handle mounted on the drill which permits the facile transportation and operation of the drill and protection of the drill when reclined in its inoperative position free from the drill carriage.

And a still further object of my invention is the provision of simple, practical and reliable constructions that are economical to manufacture, and positive and substantially trouble-free in operation.

An understanding of the manner in which these and other objects of the present invention can be attained may be had from the following description, reference being made to the accompanying drawings, in which:

FIGURE 1 is a perspective view of a preferred embodiment of the drilling assembly of the present invention, illustrating the drill and support carriage in their operative positions;

FIGURE 2 is a plan view taken along the line 2—2 of FIGURE 1;

FIGURE 3 is a detailed view in section of a portion of the base support member taken along line 3—3 of FIGURE 1;

FIGURE 5 is a plan section taken along the line 5—5 of FIGURE 4, illustrating the arrangement of the gear shift mechanism;

FIGURE 6 is a vertical section taken along the line 6—6 of FIGURE 5; and

Like reference characters refer to like parts throughout the description and the drawings.

Figure 4:
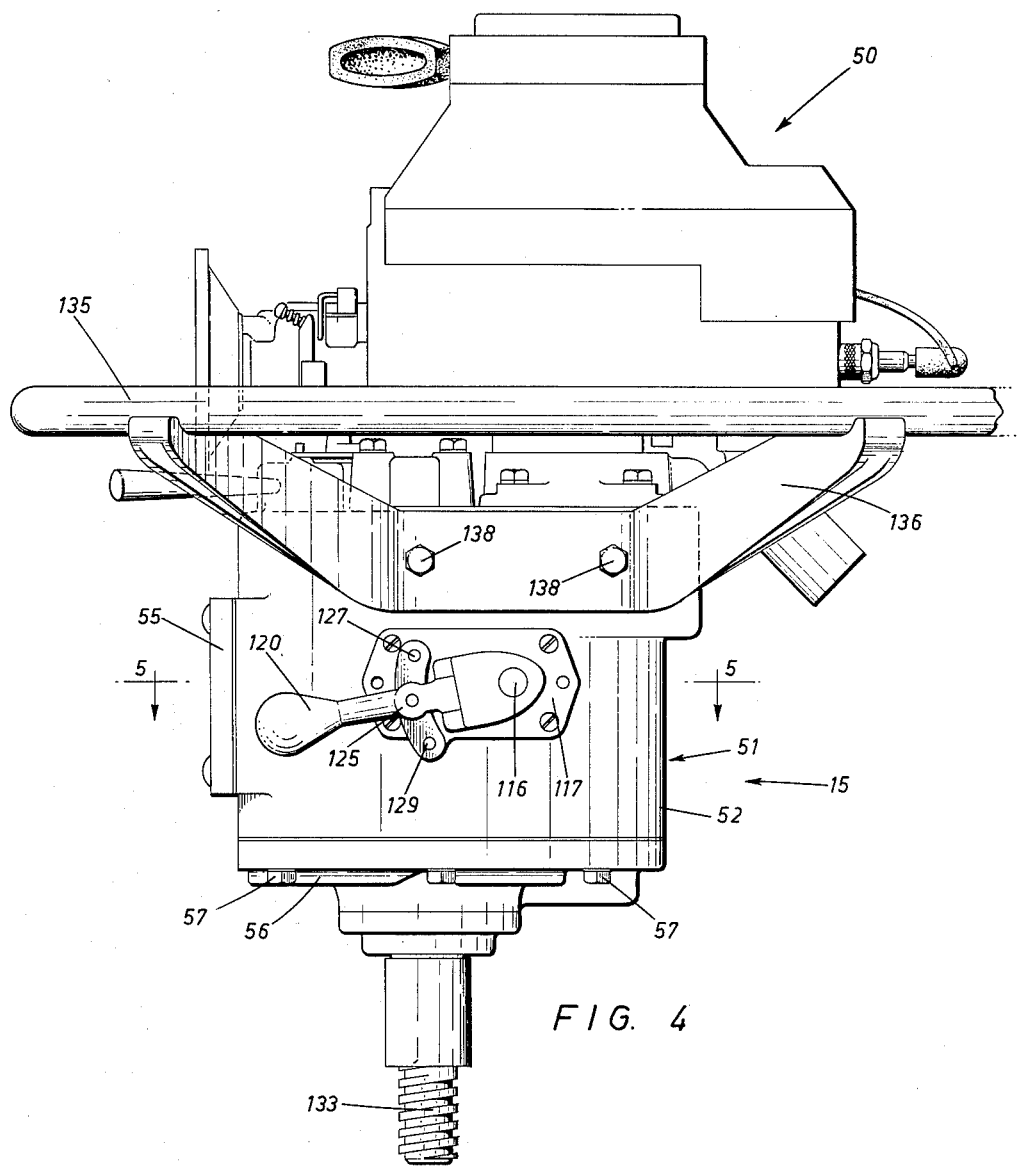
FIGURE 4 is a side elevation of the drill illustrated by FIGURE 1 showing a plan view of the external arrangement of the gear shift mechanism.

Referring first to the drill carriage illustrated by FIGURES 1 through 3, the frame 10 is comprised of two parallel post members 11–11a rigidly held a predetermined spaced distance apart by a cross-piece or head member 12 and by a base member 13.

Post members 11–11a are preferably formed of steel tubing, such as five-foot lengths of standard drill rod of 1¹⁵⁄₁₆ inch diameter. Head member 12, as described in more detail hereinafter, is preferably formed as a rigid unitary housing member which is adapted to receive the upper portions of posts 11–11a in locked engagement by means of sockets 14 formed in caps 12a. The length of the head member is determined by the horizontal dimensions of drill unit 15 which is slidably mounted between the post members. Base member 13, as illustrated in detail by FIGURE 1, is adapted to secure in pivotal engagement the lower portions of post members 11–11a by means of horizontally positioned bearing pins 16. Base member 13 comprises side portions 18–18a, cross members 19–19a and 20–20a, and end portions 21–21a which are secured together by means such as by welding to form a rigid rectangular frame. Posts 11–11a are pivotally secured at their lower extremities by bearing pins 16 which extend through spaced cross members 19–20 and 19a–20a which extend between the members 18–18a, adjacent respectively to the end members 21–21a. Bearing pins 16 are adapted by means known in the art to lock posts 11–11a in a desired drilling position by rotation of heads 22 of each of said pins 16.

Anchor plates 23 and 23a, which seat on cross members 20–21 and 20a and 21a, are adapted by means of holes 24 formed therein to be engaged by anchoring means 26. Base 13 is thereby rigidly secured to the underlying rock 25 or to a timber platform by means or rock expansion bolts 26 or the like.

The drill unit 15 is slidably mounted on and positioned between posts 11–11a by means of a support assembly 27 which consists of intermediary webs or bracket members 29–29a and 30–30a which rigidly secure the drill unit to guide sleeves 28–28a to form a unitary assembly. Guide sleeves 28–28a are slidably mounted on posts 11–11a respectively.

The drill unit 15 is raised and lowered between the posts 11–11a by means of chains 31–31a which are extended over sprockets 32–32a and 33–33a. Sprockets 32–32a are rotatably mounted at the lower ends of post members 11–11a and sprockets 33–33a are rotatably mounted in housing member 12. The ends of the chains are adjustably connected to the brackets 29–29a and 30–30a at 34 and 35 by known means. At least one pair of sprockets is mounted on a transverse shaft 36 which extends between the posts 11–11a, preferably at the top of the carriage where it is out of the way of the drill rod, so that rotation of the shaft, such as by control wheel 37, rotates the shaft and the pair of sprocket wheels 33 mounted thereon to raise or lower the drill unit by means of the intermediary chains.

A preferred sprocket assembly is illustrated in FIGURE 2 in which a sprocket wheel 33 is rigidly mounted at each end of shaft 36, which, in turn, is rotatably mounted at each end thereof in bushings 38, 39 and 40. Bushings 38 and 39 are rigidly mounted in head member 12 adjacent to and behind socket 14. Bushing 40, which carries shaft 36 on the opposite side of sprocket wheel 33, is mounted in bracket 41 which is in turn rigidly secured to front member 42 of head assembly 12. A portion 36a of shaft 36 extends externally from the head housing 12 and is adapted to receive wheel 37 for selective rotation of shaft 36. A ratchet detent mechanism, not shown, preferably is incorporated within housing 12 for locking shaft 36 from rotational movement in one direction while permitting rotation in the opposite direction.

The diameter of the upper portion of socket 14 is reduced to permit positive engagement of cap 12a with shoulder 45 of post 11 or 11a and thus lock head assembly 12 to posts 11 and 11a in positive but removable engagement.

In operation, the drill carriage is preferably erected and locked in the desired drilling position by drilling two shallow holes in the underlying rock and inserting rock bolts 26 through openings 24 of anchor plates 23 and 23a into said shallow holes. The positioning of the base is important in the drilling of inclined holes where the strike must be considered. For example, an imaginary line running through bearing pins 16 would be established at right-angles to the strike of the drill hole and the frame assembly 10 tilted at the desired dip angle. To lock the frame assembly in inclined position, a pair of back leg supports are employed.

Threaded couplings 46 are pivotally mounted at each end of head member 12, as shown by FIGURE 2, to permit attachment of back leg supports to the frame assembly.

The drill can be raised or lowered by setting the ratchet detent mechanisms contained in head 12 and rotating the wheel 37 in the desired direction.

Referring now to the drill of the present invention as illustrated by FIGURES 4 through 7, the drill 15 is shown driven by an internal combustion engine 50 which is of a conventional type, such as a one cylinder engine. The engine is, of course, provided with the usual fuel supply tank and means for carburating and feeding the fuel to the cylinder. In some locations, as for example in underground stations, it may be preferred to employ electric, air or hydraulic motors as a substitute for internal combustion engines. For purposes of illustration, however, the drill is illustrated driven by an internal combustion engine.

Drill unit 15 comprises a casing 51 having a body portion 52, a pair of top cover plates 53 and 54, a side inspection plate 55, and a bottom plate 56. Each of said plates is removably secured to body portion 52 by means of machine screws 57 with the aid of guide dowels 58, as necessary.

Figure 7:
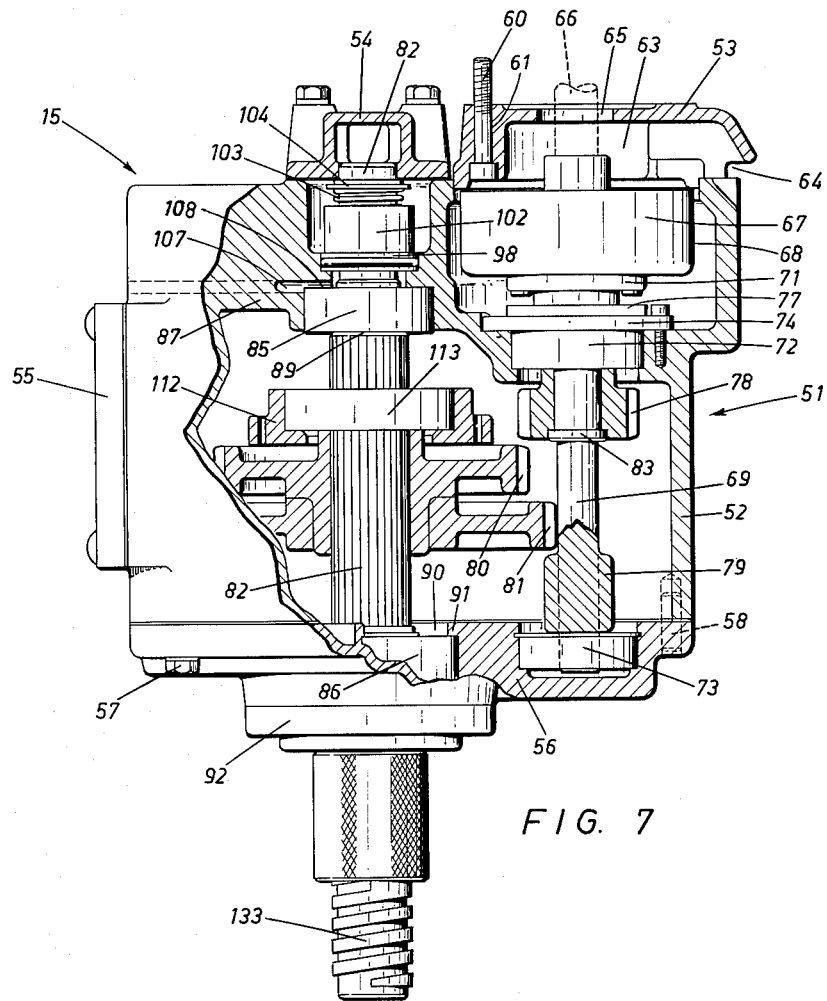
FIGURE 7 is a side elevation, partly in section, taken along the line 7—7 of FIGURE 5.

Internal combustion engine 50 is rigidly mounted on top cover plate 53 by means of machine screws 60 extending through openings 61 formed in said plate and adapted to engage threaded openings 62 formed in body portion 52 in alignment therewith, as most clearly illustrated by FIGURE 7. Plate 53 is of the configuration illustrated to provide a chamber 63 which is in communication with the atmosphere by means of opening 64 formed in one side thereof.

An opening 65 formed in plate 53 is adapted to receive drive shaft 66 of engine 50 which is rigidly connected at its lower end to a centrifugal clutch 67 of a conventional type. Clutch 67 comprises a drum 68 rigidly connected to a driven shaft 69 by means of hub 71 which is journalled into body portion 52 of the casing for rotational movement therein by means of bearings 72 and 73. A collar 74 disposed immediately above upper bearing 72 and rigidly secured to shoulder 75 is adapted to lock bearing 72 from axial movement while carrying a seal or packing device such as a rawhide oil seal 77 or the like which protects bearing 72 and the gears therebelow from foreign matter which may enter by port 64.

A pair of pinion gears 78 and 79 are secured to drive pinion shaft 69 at opposite ends thereof for selective engagement with gears 80 and 81 respectively which are keyed or otherwise splined onto hollow spindle 82 as will be explained hereinbelow. Upper pinion gear 78 splined onto shaft 69 for rotation therewith is axially secured onto said shaft by abutment with bearing 72 and annular shoulder 83 formed on pinion shaft above and below said gear respectively. Lower pinion gear 79 preferably is formed integral with pinion shaft 69.

Spindle 82 extending through body portion 52 of casing 51 is journalled thereinto for rotational movement therein by means of an upper sealed bearing 85 and a lower thrust bearing 86. Upper bearing 85 seated in an opening formed in an upper wall 87 of casing body portion 52 is locked from axial movement by shoulder 88 above and shoulder 89 on spindle 82 below. Lower bearing 86 seated in an opening 90 formed in bottom plate 56 is locked from axial movement by shoulder 91 above and a retainer collar 92 below.

Referring now to FIGURES 6 and 7, the open upper end 93 of spindle 82 is in communication with chamber 94 which is connected by port 95 to an outside source of water. Water introduced under pressure to chamber 94 via port 95 is fed into the upper end of spindle 82 and through bore 96 of the spindle to drill rods connected thereto. To seal the bearings and gears contained within the casing from water, a shaft sealing device 97 is disposed above bearing 85 concentric with the spindle. This device comprises a stationary ring member 98, preferably formed from stainless steel, adapted to seat on shoulder 88. An annular recess 99 on the periphery of said ring is adapted to carry an O-ring 100 which abuts in tight-fitting relation with wall 101, thereby forming a water-tight seal therewith. A rotary seal member 102, preferably formed from an oil saturated self-lubricating material such as sold under the trade name "Oilite," is mounted on shaft 82 immediately above ring member 98 and has its lower face lapped to abut the upper face of ring member 98 to form a water-tight seal therebetween. Seal member 102 is biased against stationary member 98 by a compression spring 103 which is compressed between snap-ring 104 anchored to spindle 82 and annular shoulder formed on the inner wall of rotary member 102. An O-ring disposed between spindle 82 and member 102 provides an effective water seal therebetween.

In the event either of the O-rings or the lapped joint should leak due to wear or improper fitting, a seal leakage port 107 is provided between the sealing device and bearing 83 to permit water to drain therefrom. This port not only precludes a water pressure build-up which could cause leakage around bearing seal 108 but also, in allowing water to drain, warns the drill operator that the sealing device is failing.

Referring now especially to FIGURES 5 and 7, synchromesh gears 80 and 81 splined onto shaft 82 are coupled together by connecting screw 109. Gears 80 and 81 are slidably mounted on said shaft such that they can be maintained in a neutral position, as indicated by the drawings, raised so that upper gear 80 is engaged with pinion gear 78, or lowered so that lower gear 81 is engaged with pinion gear 79; thus providing neutral, fast and slow drill speeds.

The gear shift mechanism for controlling these gears comprises a shifting fork 110 which is loosely fitted into a guide opening 111 formed in body portion 52 of casing 51 for slidable movement therein. A collar 112 formed at the bottom of fork 111 functions as the outer race of bearing 113, the inner race of which is secured to an upper extension of gear 80 such that said gear can rotate independently of the collar and fork. A swivel 114 keyed into fork 110 is pivotally mounted into one end of shift lever 115 which, in turn, is keyed and locked onto shift lever shaft 116. Shaft 116 extending through an opening in shift lever cover 117 for rotational movement therein is keyed into yoke 118 which is adapted to pivot about the axis of shaft 116. Yoke 118 in turn pivotally carries shift lever 120 by means of pin 121 which passes through a central opening in said lever. A coil spring 123 abutting the extension 124 of lever 120 biases the opposite end 125 of said lever against cover plate 117 such that detent opening 126 formed in the lever will be normally in engagement with one of gear positioning studs 127, 128 or 129 which are arcuately positioned on said plate. It will be apparent that by setting lever 120 in engagement with central stud 128 that the gears 80 and 81 will be in a neutral position between the two drive pinion gears 78 and 79. By raising lever 120 such that stud 127 is engaged by detent 126, shaft 116 is rotated pivoting lever 115 upwardly to raise swivel 114 and fork 110. Gears 80 and 81 are thereby raised on spindle 82 such that the former engages spline gear 78 for rotation thereby. By lowering shift lever 120 such that it engages stud 129, gears 80 and 81 are lowered causing the latter gear 81 to engage lower pinion gear 79.

The inner race of thrust bearing 86 is axially secured to spindle 82 by retaining ring 130 above and spindle shoulder 131 below to prevent axial separation of the spindle from the casing 51. A seal such as a rawhide oil seal 132 or the like disposed immediately below bearing 86 protects said bearing from extraneous foreign matter.

The lower end of hollow spindle 82 is externally threaded, as designated by numeral 133 as illustrated by FIGURE 8, to receive a drill rod, core barrel adaptor or the like drilling attachment.

As illustrated by the drawings, a circular handle 135 is rigidly secured to the drill by means of a pair of handle brackets 136 and 137 which in turn are connected to the casing 51 by bolts 138 and to the handle by screws 139. It is apparent that the drill can be transported and positioned manually for operation by handle 135 or operated in combination with the drill carriage described in detail hereinabove.

In operation, the engine 50 is started and the drill placed in its drilling position with the gear shift in neutral position. The engine is operated at the desired speed and the gear shift placed either in low or high speed as desired. Thus either driving spline gears 78 or 79 rotated by spline shaft 69 is brought into engagement with corresponding driven gears 80 or 81 which in turn rotate main spindle 82. In the embodiment illustrated, gear ratios are provided whereby drilling speeds of 1000 or 2000 revolutions per minute can be obtained from a power supply turned at 6000 revolutions per minute. Spindle 82 is coupled to a string of drill rods, core barrel or the like which is rotated at the desired drilling speed as selected by the machine operator to suit drilling requirements. For example, a drilling speed of 1000 revolutions per minute would be used for coring large diameter or deep holes and a drilling speed of 2000 revolutions per minute used for small diameter or shallow holes. Water introduced through chamber 94 into bore 96 of spindle 82 travels through the drill string or the like to the cutting face to lubricate the bit and carry cuttings to the surface.

The present invention provides a number of important advantages. A completely satisfactory drill can be manufactured which weighs only about 56 pounds and thus can be transported readily by one man over rough and difficult terrain. The convenient arrangement of parts permits the facile manipulation of the drill by one man during a drilling operation in any direction for drilling blast holes or for recovering core samples up to 8 inches in diameter. To supplement the drilling operation of the unit, the drill is adapted to be used in combination with a support carriage such that core samples up to 2 inches in diameter can be recovered to depths up to 450 feet while maintaining a uniform pressure on the drill bit.

In operation, the drive motor can be disengaged from the drive spindle independently of the speed of the motor or the speed of the drive spindle can be varied to one of the two drive speeds governed by the ratio of the two sets of mating gears 78 and 80 or 79 and 81 to provide the optimum mechanical advantage. Thus the drilling speed can be varied to suit rock and bit conditions or the motor accelerated while the drill string is stationary to overcome high starting torque loads encountered in deep holes and the like which otherwise would stall the motor. The drill and carriage are each readily portable and simple and substantially trouble-free in operation providing reliable and inexpensive drill facilities regardless of the difficulty of the terrain.

It will be understood, of course, that modifications can be made in the preferred embodiment of the invention described and illustrated herein without departing from the scope of the invention as defined by the appended claims.

What I claim as new and desire to protect by Letters Patent of the United States is:

1. In a portable rock drill, the combination of a casing, a drive motor mounted on one end of said casing; a clutch chamber within said casing, a centrifugal clutch disposed within said clutch chamber connected to and driven by said motor; a gear chamber within said casing adjacent said clutch chamber, power transmission gear means rotatably mounted in said gear chamber operably connectable to said clutch; a drill spindle having an axial passageway journalled within said gear chamber for rotation therein, manually operable gear shift means connected to said gear means for selectively engaging and disengaging the drill spindle with said clutch; a fluid chamber within said casing spaced from said gear chamber, said spindle being adapted to extend through the gear casing such that one end of said spindle projects into the fluid chamber communicating the spindle axial passageway with said fluid chamber and the opposite end of the spindle projects externally from the casing; port means communicating said fluid chamber with a source of fluid for supplying the spindle passageway with a continuous flow of fluid; seal means interposed between said spindle and casing for preventing fluid leakage from the fluid chamber into the gear chamber; means carried by the externally projecting end of said spindle for coupling the drill spindle to a drill tool, and handle means secured to said casing for manual support.

2. In a portable rock drill, the combination of a casing, a drive motor mounted on one end of said casing; a clutch chamber within said casing, a centrifugal clutch disposed within said clutch chamber connected to and driven by said motor; a gear chamber within said casing adjacent said clutch chamber, power transmission gear means rotatably mounted in said gear chamber operably connectable to said clutch; a drill spindle having an axial passageway journalled within said gear chamber for rotation therein; manually operable gear shift means connected to said gear means for selectively engaging and disengaging the drill spindle with said clutch; a fluid chamber within said casing spaced from said gear chamber, said spindle being adapted to extend through the gear casing such that one end of said spindle projects into the fluid chamber communicating the spindle axial passageway with said fluid chamber and the opposite end of the spindle projects externally from the casing; port means communicating said fluid chamber with a source of fluid for supplying the spindle passageway with a continuous flow of fluid, seal means interposed between said spindle and casing for preventing fluid leakage from the fluid chamber into the gear chamber; a second fluid chamber within said casing between the seal means and gear chamber, port means for communicating said second fluid chamber with the atmosphere for discharging fluid leakage past said seal; means carried by the externally projecting end of said spindle for coupling the drill spindle to a drill tool, and handle means secured to said casing for manual support.

3. In a portable rock drill, the combination of a casing, a drive motor mounted on one end of said casing; a clutch chamber within said casing, a centrifugal clutch disposed within said clutch chamber connected to and driven by said motor; a gear chamber within said casing adjacent said clutch chamber, power transmission gear means rotatably mounted in said gear chamber connected to and driven by said clutch; a hollow drill spindle journalled within said gear chamber for rotation therein; manually operable gear shift means connected to said gear power transmission means for selectively engaging and disengaging the drill spindle with said clutch, a fluid chamber within said casing spaced from said gear chamber, said spindle being adapted to extend through the gear casing such that one end of said spindle projects into the fluid chamber communicating the spindle bore with said fluid chamber and the opposite end of the spindle projects externally from the casing; port means communicating said fluid chamber with a source of fluid for supplying the spindle bore with a continuous flow of fluid, seal means interposed between said spindle and casing for preventing fluid leakage from the fluid chamber into the gear chamber; a second fluid chamber within said casing between the seal means and gear chamber, port means for communicating said second fluid chamber with the atmosphere for discharging fluid leakage past said seal; means carried by the externally projecting end of said spindle for coupling the drill spindle to a drill tool; and means for supporting and raising and lowering the drill casing.

4. In a portable rock drill, the combination of a casing, a drive motor mounted on one end of said casing; a clutch chamber within said casing, a centrifugal clutch disposed within said clutch chamber connected to and driven by said motor; a gear chamber within said casing adjacent said clutch chamber, a pinion shaft journalled within said gear chamber for rotation therein and connected to and driven by said clutch, a pair of spaced apart pinion gears carried by said pinion shaft for rotation therewith, a drill spindle having an axial passageway journalled within said gear chamber for rotation therein and bearing a spaced apart parallel relation with said pinion shaft, a pair of gear wheels slidably splined onto said spindle for axial movement into one of three positions such that one of said gear wheels can be engaged with one of the two pinion gears for transmission of power from the pinion shaft to the drill spindle and selectively disengaged from the pinion gears; manually operable means for selecting the position of the gear wheels on the spindle; a fluid chamber within said casing spaced from said gear chamber, said spindle being adapted to extend through the gear casing such that one end of said spindle projects into the fluid chamber communicating the spindle axial passageway with said fluid chamber and the opposite end of the spindle projects externally from the casing; port means communicating said fluid chamber with a source of fluid for supplying the spindle passageway with a continuous flow of fluid; seal means interposed between said spindle and casing for preventing fluid leakage from the fluid chamber into the gear chamber; means carried by the externally projecting end of said spindle for coupling the drill spindle to a drill tool; and handle means secured to said casing for manual support.

5. A portable rock drill comprising a casing, a drive motor mounted on one end of said casing; a clutch chamber within said casing, a centrifugal clutch disposed within said clutch chamber connected to and driven by said motor; a gear chamber within said casing adjacent said clutch chamber; a pinion shaft journalled within said gear chamber for rotation therein and connected to and driven by said clutch, a pair of spaced apart pinion gears carried by said pinion shaft for rotation therewith, a drill spindle having an axial passageway journalled within said gear chamber for rotation therein bearing a spaced apart parallel relation with said pinion shaft, a pair of gear wheels slidably splined onto said spindle for axial movement into one of three positions such that one of said gear wheels can be engaged with one of the two pinion gears for transmission of power from the pinion shaft to the drill spindle and disengaged from the pinion gears; manually operable means for selecting the position of the gear wheels on the spindle; a fluid chamber within said casing spaced from said gear chamber, said spindle being adapted to extend from each side of the gear casing such that one end of said spindle projects into said fluid chamber for communication of the spindle axial passageway with said fluid chamber and the opposite end of the spindle projects externally from the casing; port means communicating said fluid chamber with a source of fluid for supplying the spindle passageway with a continuous flow of fluid; seal means interposed between said spindle and casing for preventing fluid leakage from the fluid chamber into the gear chamber; a second fluid chamber within said casing between the seal means and gear chamber, port means for communicating said second fluid chamber with the atmosphere for discharging fluid leakage past said seal; means carried by the externally projecting end of said spindle for coupling the drill spindle to a drill tool; and handle means secured to said casing for manual support.

6. In a portable rock drill, the combination of a casing, a drive motor mounted on one end of said casing; a clutch chamber within said casing, a centrifugal clutch disposed within said clutch chamber connected to and driven by said motor; a gear chamber within said casing adjacent said clutch chamber; a pinion shaft journalled within said gear chamber for rotation therein and connected to and driven by said clutch, a pair of spaced apart pinion gears carried by said pinion shaft for rotation therewith, a drill spindle having an axial passageway journalled within said gear chamber for rotation therein bearing a spaced apart relationship with said pinion shaft, a pair of gear wheels slidably splined onto said spindle for axial movement into one of three positions such that one of said gear wheels can be engaged with one of the two pinion gears for transmission of power from the pinion shaft to the drill spindle and disengaged from the pinion gears; manually operable means for selecting the position of the gear wheels on the spindle; a fluid chamber within said casing spaced from said gear chamber, said spindle being adapted to extend from each side of the gear casing such that one end of said spindle projects into said fluid chamber for communication of the spindle axial passageway with said fluid chamber and the opposite end of the spindle projects externally from the casing; port means communicating said fluid chamber with a source of fluid for supplying the spindle passageway with a continuous flow of fluid; seal means interposed between said spindle and casing for preventing fluid leakage from the fluid chamber into the gear chamber; a second fluid chamber within said casing between the seal means and gear chamber for collecting any fluid leakage past said seal, and port means for communicating said second fluid chamber with the atmosphere for discharging any such fluid leakage; means carried by the externally projecting end of said spindle for coupling the drill spindle to a drill tool; and means for supporting and raising and lowering the drill casing.

7. In a rock drill as claimed in claim 6, said drill support means consisting of an elongated rigid frame having a transverse member slidably mounted on said frame, means for securing said rock drill to the transverse member, and means for raising and lowering said transverse member on said frame.

References Cited by the Examiner
UNITED STATES PATENTS

| | | | |
|---|---|---|---|
| 756,731 | 4/04 | Sturtz | 277—17 |
| 1,765,629 | 6/30 | Stanley | 277—17 |
| 2,486,254 | 10/49 | Briskin et al. | 74—472 |
| 2,562,276 | 7/51 | Kandle | 173—170 |
| 2,757,905 | 8/56 | O'Leary | 173—163 |
| 2,835,472 | 5/58 | Osborn | 173—57 |
| 2,846,192 | 8/58 | Ostling | 173—163 |
| 2,863,638 | 12/58 | Thornburg | 173—57 |
| 2,914,305 | 11/59 | Wink | 173—163 |
| 3,054,465 | 9/62 | Fish | 173—57 |

FOREIGN PATENTS

| | | |
|---|---|---|
| 220,790 | 8/24 | Great Britain. |
| 866,862 | 5/61 | Great Britain. |

BROUGHTON G. DURHAM, *Primary Examiner.*